(12) United States Patent
Ide (10) Patent No.: US 11,900,512 B2
(45) Date of Patent: Feb. 13, 2024

(54) CONTENT SHARING DEVICE, METHOD, PROGRAM, AND SYSTEM FOR SHARING CONTENT DERIVED FROM DIGITAL INK

(71) Applicant: Wacom Co., Ltd., Saitama (JP)

(72) Inventor: Nobutaka Ide, Saitama (JP)

(73) Assignee: Wacom Co., Ltd., Saitama (JP)

( * ) Notice: Subject to any disclaimer, the term of this patent is extended or adjusted under 35 U.S.C. 154(b) by 102 days.

(21) Appl. No.: 17/487,847

(22) Filed: Sep. 28, 2021

(65) Prior Publication Data

US 2022/0020193 A1 Jan. 20, 2022

Related U.S. Application Data

(63) Continuation of application No. PCT/JP2020/008280, filed on Feb. 28, 2020.

(30) Foreign Application Priority Data

Apr. 25, 2019 (JP) ................................. 2019-083925

(51) Int. Cl.
*G06T 11/60* (2006.01)
*G06Q 30/04* (2012.01)
*G06V 30/32* (2022.01)

(52) U.S. Cl.
CPC .............. *G06T 11/60* (2013.01); *G06Q 30/04* (2013.01); *G06V 30/333* (2022.01)

(58) Field of Classification Search
CPC ....... G06T 11/60; G06Q 30/04; G06V 30/333
See application file for complete search history.

(56) References Cited

U.S. PATENT DOCUMENTS

| 7,158,675 B2 | 1/2007 | Gounares et al. |
| 7,397,949 B2 | 7/2008 | Dresevic et al. |
| 2015/0295897 A1* | 10/2015 | Chang ................... H04W 12/50 726/26 |

(Continued)

FOREIGN PATENT DOCUMENTS

JP 5886487 B1 3/2016

OTHER PUBLICATIONS

International Search Report, dated May 19, 2020, for International Application No. PCT/JP2020/008280, 2 pages.

(Continued)

*Primary Examiner* — Said Broome
*Assistant Examiner* — Andrew Shin
(74) *Attorney, Agent, or Firm* — Seed IP Law Group LLP (57) ABSTRACT

A content sharing device includes a content acquisition circuit configured to acquire main content and sub-content, at least one of which is derived from digital ink, and a transmission processing circuit configured to, in response to receipt of a request made by a terminal device operated by a user, select either first provision data or second provision data depending on usage rights of the user and transmit the first or second provision data that has been selected to the terminal device. The first provision data includes only the main content, while the second provision data includes both the main content and the sub-content. The sub-content includes content generated using a plurality of content elements that are generated before the main content is published or content generated using a plurality of content elements that are generated after the main content is published.

17 Claims, 10 Drawing Sheets

(56) References Cited

U.S. PATENT DOCUMENTS

| | | | |
|---|---|---|---|
| 2016/0162488 A1* | 6/2016 | Corradi | G06Q 10/1053 |
| | | | 707/734 |
| 2016/0224239 A1 | 8/2016 | Angelov et al. | |
| 2016/0292500 A1 | 10/2016 | Angelov et al. | |
| 2017/0094368 A1* | 3/2017 | Kakei | H04N 21/44209 |
| 2021/0209239 A1* | 7/2021 | Robinson | G06F 21/6209 |

OTHER PUBLICATIONS

Pixiv Inc., "Illustration Communication Service Pixiv," URL: https://www.pixiv.net, download date: Apr. 22, 2019, 1 page. (Screenshot).

\* cited by examiner

| POINT IN TIME OF REGISTRATION | POINT IN TIME OF EDITING | USER ID | PUBLICATION FLAG | ELEMENT ID | ELEMENT TYPE | EDITING COMMAND | DATA CONTENTS |
|---|---|---|---|---|---|---|---|
| T1 | t01 | User-A | OFF | 0001 | stroke | Add | ○○○ |
| T1 | t02 | User-A | OFF | 0002 | stroke | Add | ○○○ |
| ... | ... | ... | ... | ... | ... | ... | ... |
| T1 | t10 | User-A | OFF | 0010 | stroke | Add | ○○○ |
| T2 | t11 | User-A | OFF | 0011 | stroke | Add | ○○○ |
| T2 | t12 | User-A | OFF | 0012 | stroke | Add | ○○○ |
| T2 | t13 | User-A | OFF | 0013 | stroke | Add | ○○○ |
| ... | ... | ... | ... | ... | ... | ... | ... |
| T2 | t50 | User-A | OFF | 0050 | stroke | Add | ○○○ |
| T3 | t51 | User-A | OFF | 0001 | stroke | Delete | ○○○ |
| ... | ... | ... | ... | ... | ... | ... | ... |
| T3 | t60 | User-A | OFF | 0010 | stroke | Delete | ○○○ |
| T4 | t61 | User-A | ON | — | — | — | — |

| POINT IN TIME OF REGISTRATION | POINT IN TIME OF EDITING | USER ID | PUBLICATION FLAG | ELEMENT ID | ELEMENT TYPE | EDITING COMMAND | DATA CONTENTS |
|---|---|---|---|---|---|---|---|
| ⋮ | ⋮ | ⋮ | ⋮ | ⋮ | ⋮ | ⋮ | ⋮ |
| T4 | t61 | User-A | ON | — | — | — | — |
| T5 | t62 | User-C | OFF | 0051 | stroke | Add | ○○○ |
| T5 | t63 | User-C | OFF | 0052 | stroke | Add | ○○○ |
| ⋮ | ⋮ | ⋮ | ⋮ | ⋮ | ⋮ | ⋮ | ⋮ |
| T5 | t67 | User-C | OFF | 0056 | stroke | Add | ○○○ |
| T5 | t68 | User-C | ON | — | — | — | — |
| T6 | t69 | User-D | OFF | 0057 | stroke | Add | ○○○ |
| T6 | t70 | User-D | OFF | 0058 | stroke | Add | ○○○ |
| ⋮ | ⋮ | ⋮ | ⋮ | ⋮ | ⋮ | ⋮ | ⋮ |
| T6 | t90 | User-D | OFF | 0078 | stroke | Add | ○○○ |
| T6 | t91 | User-D | ON | — | — | — | — |

FIG. 4A
44

| USER ID | MEMBERSHIP TYPE | BELONGING GROUP | PAYMENT HISTORY | RECEPTION HISTORY |
|---|---|---|---|---|
| User-A | CREATOR | Group-X | ○○○ | △△△ |
| User-B | GENERAL MEMBER | N/A | ○○○ | △△△ |
| User-C | SPECIAL MEMBER | A's Fun Club Freaks of A | ○○○ | △△△ |
| User-D | SPECIAL MEMBER | A's Fun Club | ○○○ | △△△ |
| User-E | SPECIAL MEMBER | Freaks of A | ○○○ | △△△ |
| ... | ... | ... | ... | ... |

FIG. 4B
46

| CONTENT ID | TYPE OF COPYRIGHTED WORK | AUTHOR | CALCULATION METHOD |
|---|---|---|---|
| The Catchy Cat | Primary | User-A | □□□ |
| The Catchy Cat-D1 | Derivative | User-A User-C User-D | □□□ |
| The Catchy Cat-D2 | Derivative | User-A User-C User-E | □□□ |
| ... | ... | ... | |

ID
CONTENT SHARING DEVICE, METHOD, PROGRAM, AND SYSTEM FOR SHARING CONTENT DERIVED FROM DIGITAL INK

BACKGROUND

Technical Field

The present disclosure relates to a content sharing device, a method, a program, and a system for sharing content derived from digital ink among a plurality of users.

Description of the Related Art

Digital ink generated from an electronic pen is data used to reproduce a trajectory of the electronic pen, just as a conventional pen leaves handwriting on paper. As digital ink, U.S. patent Ser. No. 07/158,675 (hereinafter, Patent Document 1) discloses an example of object-based digital ink as a data model inside a computer, while U.S. patent Ser. No. 07/397,949 (hereinafter, Patent Document 2) discloses an example of a serialized format for digital ink.

Another type of digital ink data is known that goes beyond merely reproducing handwriting and that enables recording "when, by whom, where, and under what circumstances" the handwriting has been performed as the trajectory (trace) of human behavior. For example, Japanese Patent No. 5886487 (hereinafter, Patent Document 3) discloses digital ink that makes it possible to identify who drew the stroke data depicting the trajectory. U.S. Patent Application Publication No. 2016/0224239 (hereinafter, Patent Document 4) discloses digital ink that can acquire pieces of information as context data when stroke data is input, such as the author, pen identification (ID), time information, and location information acquired using global positioning system (GPS), and recording the acquired context data as metadata.

A social networking service (SNS) for sharing digital content created by creators is known. One example is "illustration communication service pixiv," Pixiv Inc. [retrieved on Apr. 22, 2019], Internet <URL: https://www.pixiv.net/> (hereinafter, Non Patent Document 1). This service is expected to connect people with similar interests by allowing them to upload and bookmark content.

When a user does not care for a creator or a work, the user may want to view only that work. On the other hand, when the user likes the creator or the work, the user may wish to engage more with the work than merely viewing it. The service, however, does not quite support the latter case.

BRIEF SUMMARY

It is desirable to provide a content sharing a device, a method, a program, and a system that can provide fine-tuned services according to user preferences.

According to a first aspect of the present disclosure, there is provided a content sharing device including a content acquisition circuit configured to acquire main content and sub-content, at least one of which is derived from digital ink, and a transmission processing circuit configured to, in response to receipt of a request made by a terminal device operated by a user, select either first provision data or second provision data depending on usage rights of the user and transmit the first or second provision data that has been selected to the terminal device, the first provision data including only the main content that has been acquired by the content acquisition circuit, and the second provision data including both the main content and the sub-content that have been acquired by the content acquisition circuit. The sub-content includes content generated using a plurality of content elements that are generated before the main content is published or content generated using a plurality of content elements that are generated after the main content is published.

According to a second aspect of the present disclosure, there is provided a content sharing method performed by one or a plurality of computers and including acquiring main content and sub-content, at least one of which is derived from digital ink, and in response to receipt of a request made by a terminal device operated by a user, selecting either first provision data or second provision data depending on usage rights of the user and transmitting the first or second provision data that has been selected to the terminal device, the first provision data including only the main content that has been acquired, and the second provision data including both the main content and the sub-content that have been acquired. The sub-content includes content generated using a plurality of content elements that are generated before the main content is published or content generated using a plurality of content elements that are generated after the main content is published.

According to a third aspect of the present disclosure, there is provided a content sharing program configured to cause one or a plurality of computers to perform acquiring main content and sub-content, at least one of which is derived from digital ink, and, in response to receipt of a request made by a terminal device operated by a user, selecting either first provision data or second provision data depending on usage rights of the user and transmitting the first or second provision data that has been selected to the terminal device, the first provision data including only the main content that has been acquired, and the second provision data including both the main content and the sub-content that have been acquired. The sub-content includes content generated using a plurality of content elements that are generated before the main content is published or content generated using a plurality of content elements that are generated after the main content is published.

According to a fourth aspect of the present disclosure, there is provided a content sharing system including a content sharing device and at least one terminal device configured to communicate bidirectionally with the content sharing device. The content sharing device includes a content acquisition circuit configured to acquire main content and sub-content, at least one of which is derived from digital ink, and a transmission processing circuit configured to, in response to receipt of a request made by a terminal device operated by a user, select either first provision data or second provision data depending on usage rights of the user and transmit the first or second provision data that has been selected to the terminal device, the first provision data including only the main content that has been acquired by the content acquisition circuit, and the second provision data including both the main content and the sub-content that have been acquired by the content acquisition circuit. The sub-content includes content generated using a plurality of content elements that are generated before the main content is published or content generated using a plurality of content elements that are generated after the main content is published.

According to embodiments of the present disclosure, fine-tuned services according to user preferences are provided.

DETAILED DESCRIPTION

A content sharing device according to an embodiment of the present disclosure will be described in relation to a content sharing method, a content sharing program, and a content sharing system with reference to the accompanying drawings. The present disclosure is not limited to the following embodiments and modifications, and any changes can be made to the present disclosure without departing from the scope of the present disclosure. The configurations described in the embodiments and modifications may be optionally combined as long as no technical inconsistency arises.

Configuration of Content Sharing System 10

Overall Configuration

Figure 1:
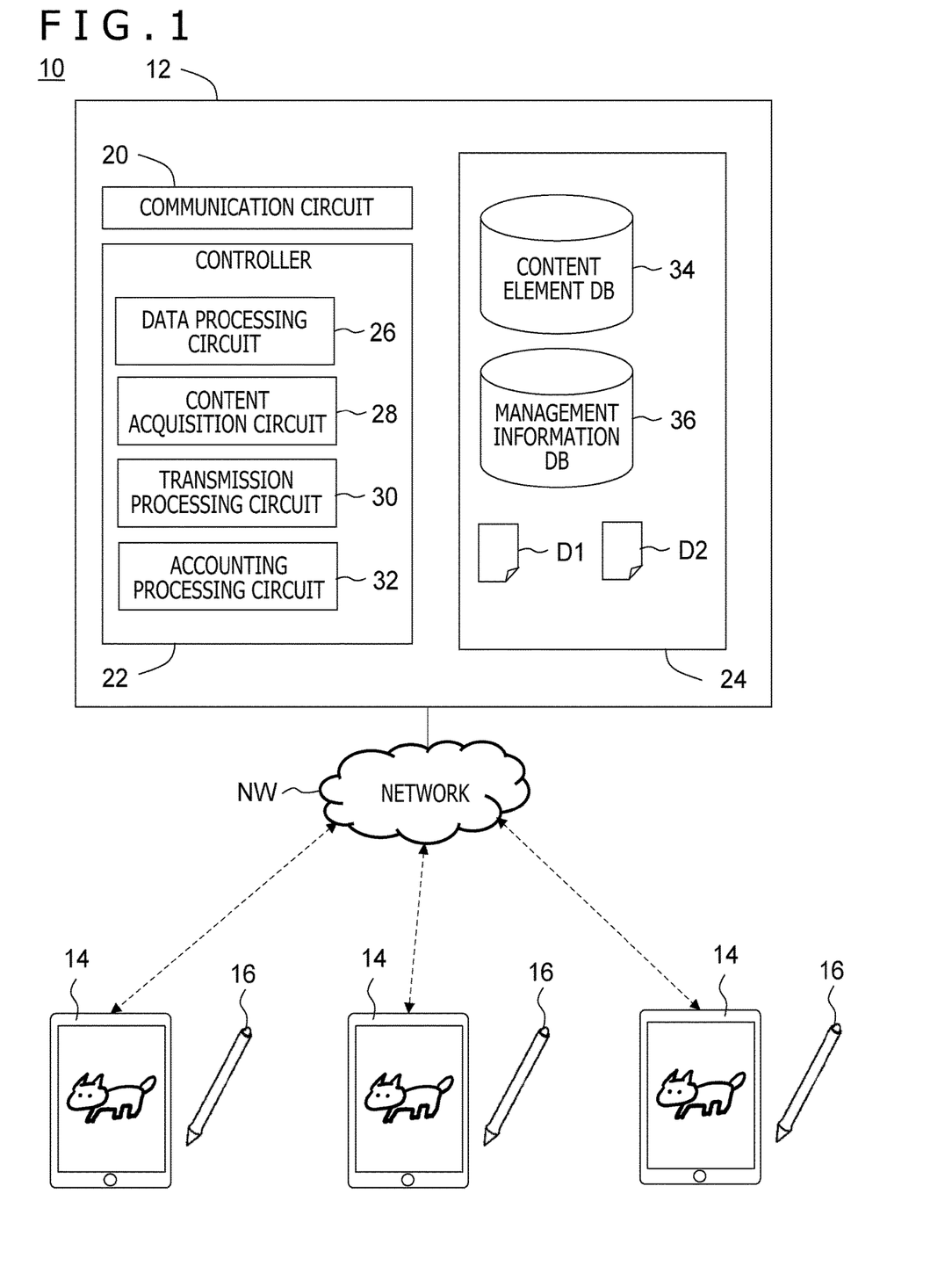
FIG. 1 is an overall configuration diagram of a content sharing system in which a content sharing device according to an embodiment of the present disclosure is incorporated.

FIG. 1 is an overall configuration diagram of a content sharing system 10 in which a content sharing device 12 according to an embodiment of the present disclosure is incorporated. The content sharing system 10 can provide a "content sharing service" for sharing digital content (hereinafter sometimes referred to simply as "content") among a plurality of users. The content sharing system 10 includes the content sharing device 12 and one or a plurality of terminal devices 14, which can communicate bidirectionally with the content sharing device 12 via a network NW.

The content sharing device 12 is a computer that performs overall control related to the content sharing service and may be of an on-premise type or a cloud type. Although the content sharing device 12 is illustrated as a single computer in FIG. 1, the content sharing device 12 may be a group of computers that constitute a distributed computation system. Specifically, the content sharing device 12 may include a communication circuit 20, a controller 22, and a storage 24.

The communication circuit 20 is an interface that transmits and receives electrical signals to and from external devices. The controller 22 includes a processing arithmetic device that may be a central processing unit (CPU) or a micro-processing unit (MPU). By reading and executing a program stored in the storage 24, the controller 22 functions as a data processing circuit 26, a content acquisition circuit 28, a transmission processing circuit 30, and an accounting processing circuit 32.

The storage 24 includes a non-transitory and computer-readable storage medium such as a hard disk drive (HDD) or a solid-state drive (SSD). The storage 24 stores various data handled by the content sharing device 12.

Specifically, the storage 24 may include a database in which content elements are accumulated (hereinafter referred to as a content element DB 34) and a database in which management information for providing the content sharing service is accumulated (hereinafter referred to as a management information DB 36). First provision data D1 and second provision data D2, both of which will be described later, are stored in the storage 24.

The terminal device 14 includes, for example, a multi-functional and multipurpose device. Examples of the multifunctional and multipurpose device include a personal computer, a smartphone, a tablet, and an e-book reader. The terminal device 14 has editing and viewing functions and a communication function. The editing and viewing functions allow the user to edit or view content via a user interface including a touch panel display. The communication function transmits and receives content through wired or wireless communication. An electronic pen 16 is, for example, a pen-type input device of an active electrostatic (AES) type or an electro-magnetic resonance (EMR) type.

Figure 2:
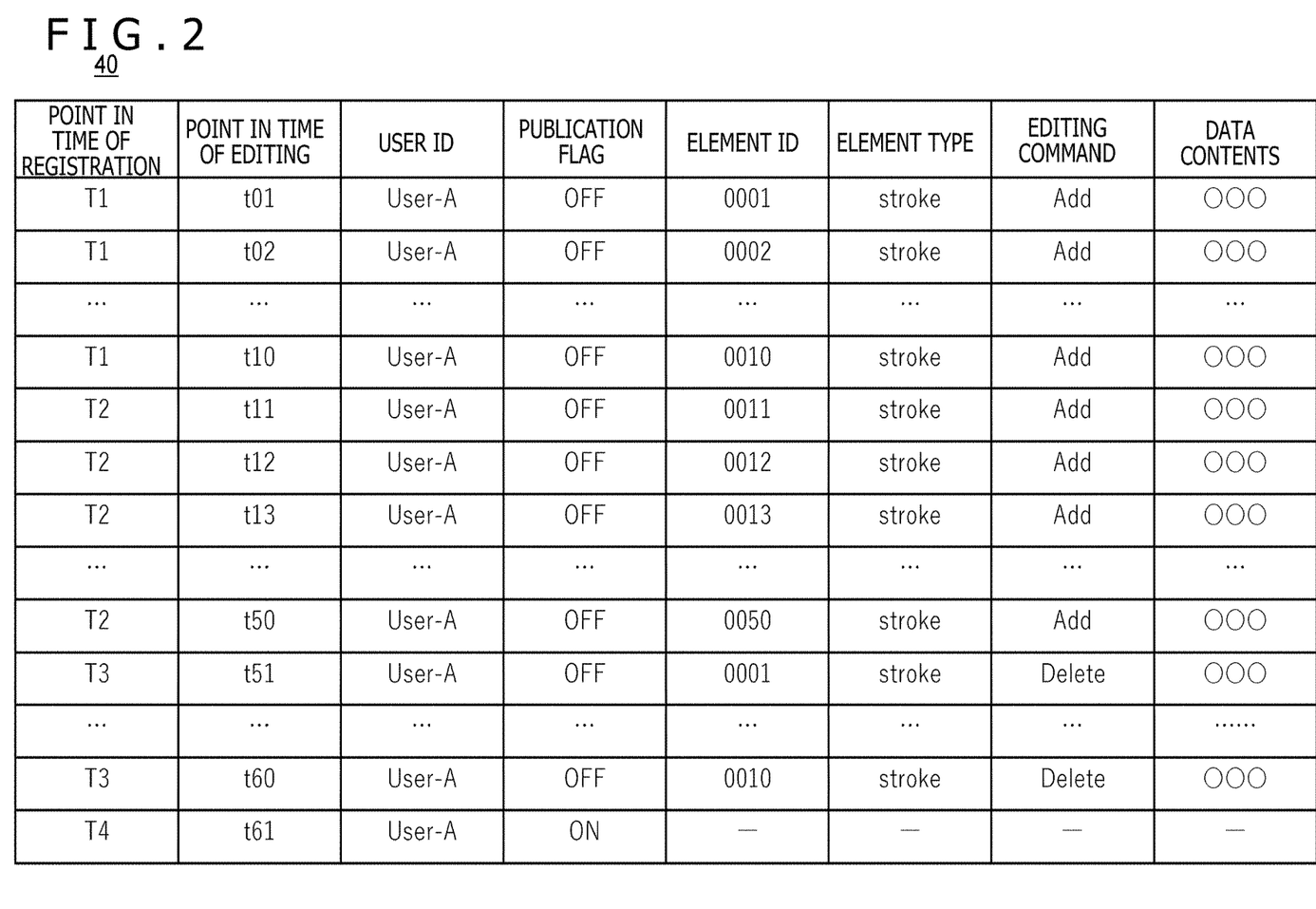
FIG. 2 is a diagram illustrating an example of the data structure of a content element database (DB) illustrated in FIG. 1.
Figure 3:
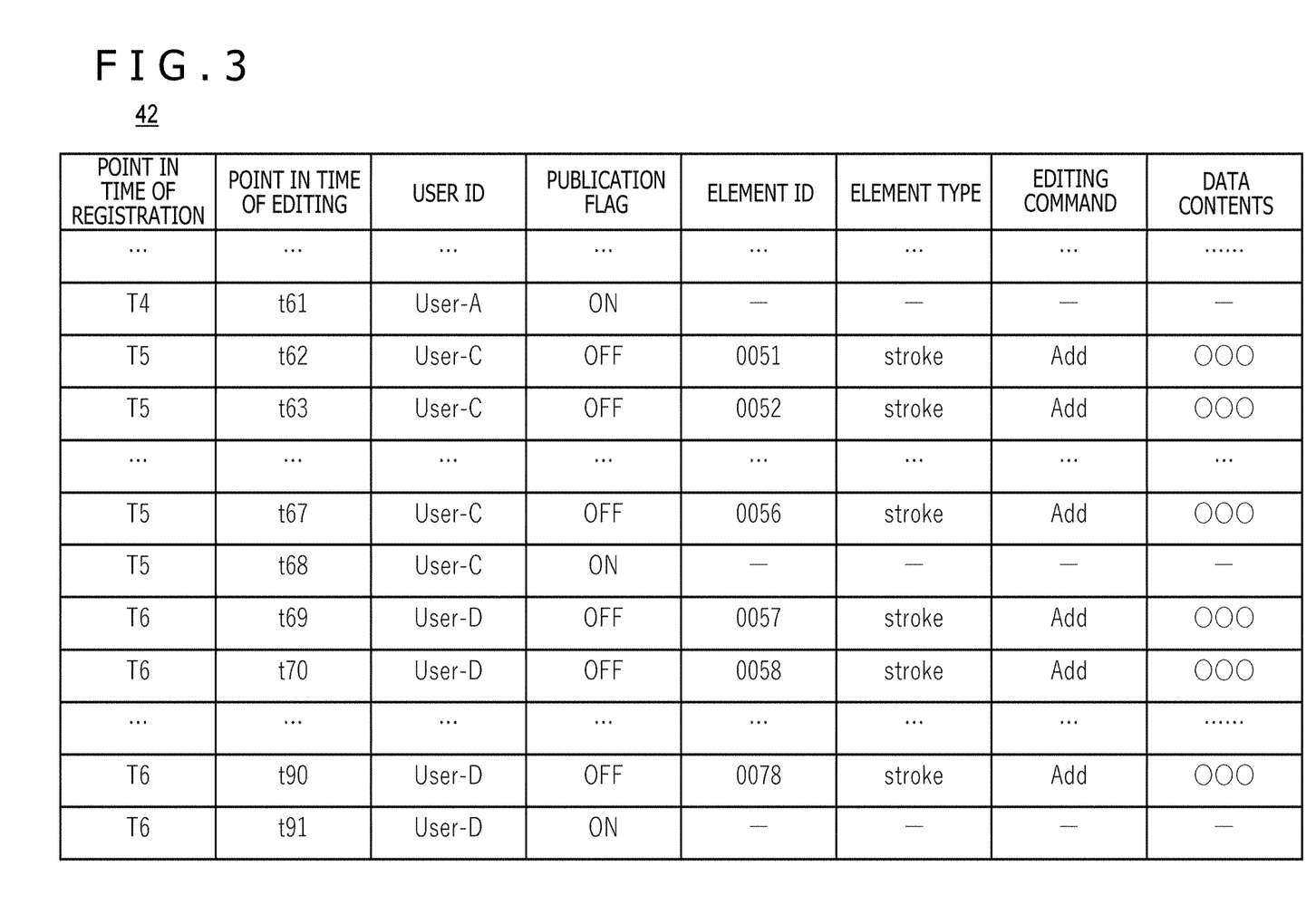
FIG. 3 is a diagram illustrating an example of the data structure of the content element DB illustrated in FIG. 1.

FIGS. 2 and 3 are diagrams illustrating an example of the data structure of the content element DB 34 illustrated in FIG. 1. Each of element data groups 40 and 42 is a collection of pieces of element data indicating a plurality of content elements that constitute the content. The element data group 40 illustrated in FIG. 2 denotes a plurality of content elements that are generated before main content 50 is published. The element data group 42 illustrated in FIG. 3 denotes a plurality of content elements that are generated after the main content 50 is published.

Each element data indicates the correspondence relation among the "point in time of registration," "point in time of editing," "user ID," "publication flag," "element ID," "element type," "editing command," and "data contents." The "point in time of registration" indicates the point in time when the content element has been registered in the content sharing device 12 through uploading of the content element. The "point in time of editing" indicates the point in time when the content element has been edited. The "user ID" is identification information for identifying the user. The "publication flag" indicates whether the content has been published. The "element ID" is identification information for identifying the content element. The "element type" indicates the type of content element. The "editing command" indicates the attribute of editing. The "data contents" indicate the contents of the element data. Examples of the "element type" include a text, an image, and audio, in addition to a stroke. As the "editing command," the addition, change, or deletion of the content element may be selected.

As understood from FIG. 2, 10 strokes (element IDs=0001 to 0010) have been collectively added by a user A at the point in time of registration T1. Further, 40 strokes (element IDs=0011 to 0050) have been collectively added at the point in time of registration T2. After that, the 10 strokes (element IDs=0001 to 0010) have been collectively deleted by the user A at the point in time of registration T3. After that, the content has been published by the user A at the point in time of registration T4 (at the point in time of the publication of the main content 50 to be described later).

As understood from FIG. 3, 6 strokes (element IDs=0051 to 0056) have been collectively added and derivative content 54, to be described later, has been published by a user C who is different from the user A, at the point in time of registration T5. After that, 22 strokes (element IDs=0057 to 0078) have been collectively added and derivative content 56, to be described later, has been published by a user D who is different from the user A, at the point in time of registration T6.

Figure 4A:
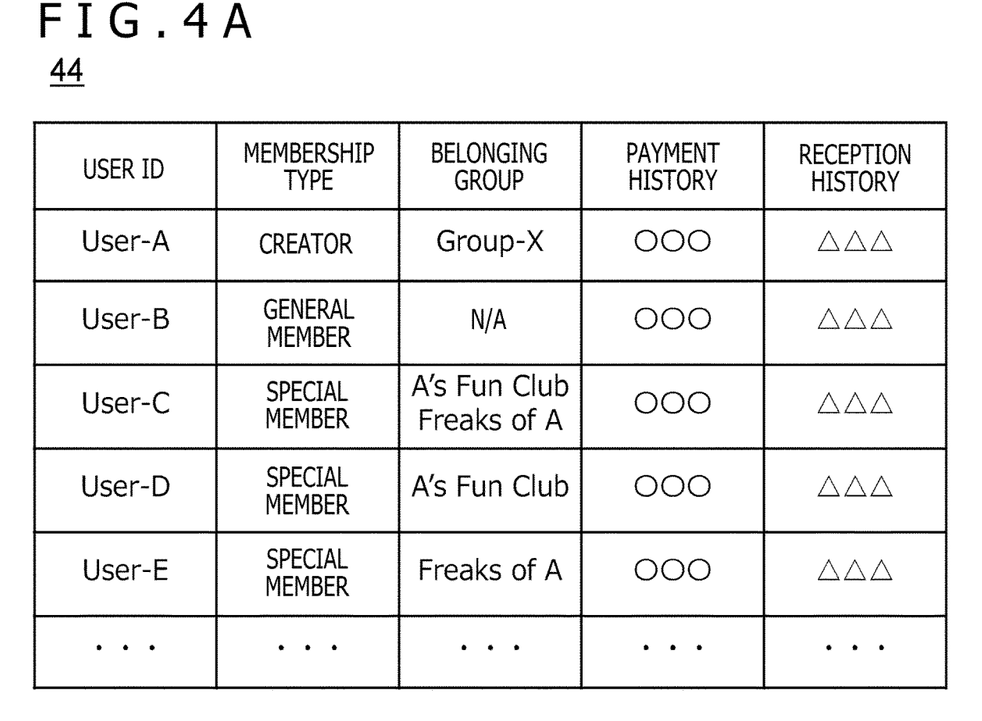
FIG. 4A is a diagram illustrating an example of the data structure of user information in a management information DB.
Figure 4B:
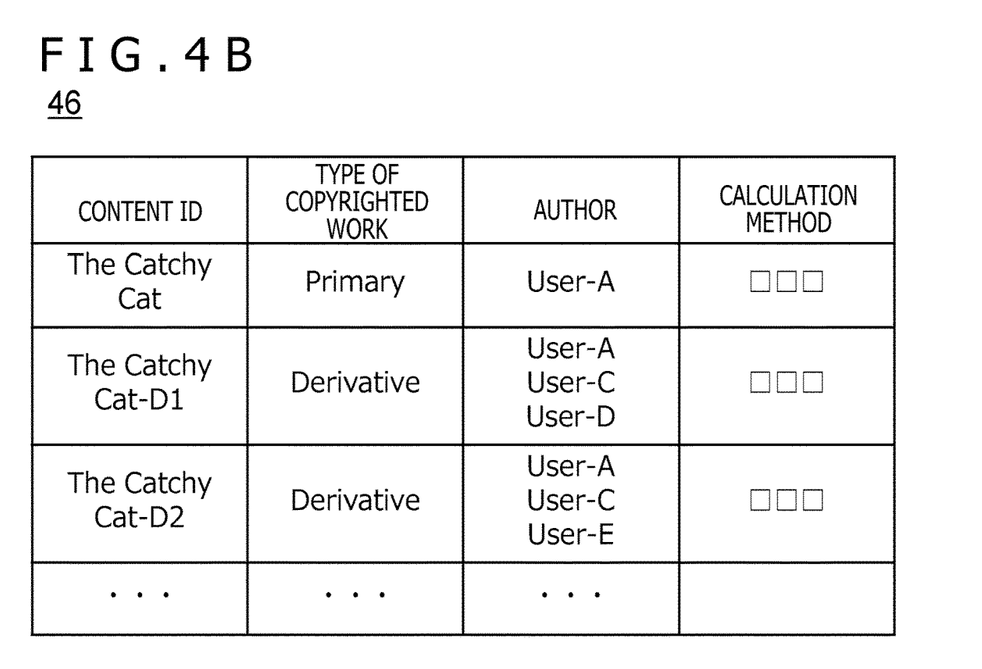
FIG. 4B is a diagram illustrating an example of the data structure of copyright information in the management information DB.

FIGS. 4A and 4B are diagrams illustrating an example of the data structure of the management information DB 36 illustrated in FIG. 1. In more detail, FIG. 4A illustrates user information 44 for managing users, while FIG. 4B illustrates copyright information 46 for managing the copyright of content.

As illustrated in FIG. 4A, the user information 44 denotes the correspondence relation among the "user ID," "membership type," "belonging group," "payment history," and "reception history." The "membership type" indicates the rights to use the service. The "belonging group" is a group to which the user belongs. The "payment history" indicates the payment status of a fee for the use of the copyrighted work. The "reception history" indicates the reception status of a fee for the use of the copyrighted work. Examples of the "membership type" include a "creator," a "general member," and a "special member." The "creator" has the rights to create the main content 50. The "general member" has the rights to view the main content 50. The "special member" has the rights to view the main content 50 and sub-content 52.

As illustrated in FIG. 4B, the copyright information 46 denotes the correspondence relation among "content ID," "type of copyrighted work," "author," and "calculation method." The "content ID" indicates the identification information for identifying the content. The "type of copyrighted work" indicates the type of the copyrighted work. The "author" indicates the author of the content. The "calculation method" indicates a calculation method regarding the fee for the use of the copyrighted work. Examples of the "type of copyrighted work" include a primary work and a derivative work.

First Operation of Content Sharing System 10

Next, a first operation of the content sharing system 10 will be described, mainly with reference to the sequence diagram of FIG. 5. The "first operation" refers to operations related to the creation and viewing of the main content 50. The following description is based on a use case, as an example, in which the user A who is a creator creates the main content 50, and users B and C view the main content 50.

Description of Sequence Diagram

Figure 5:
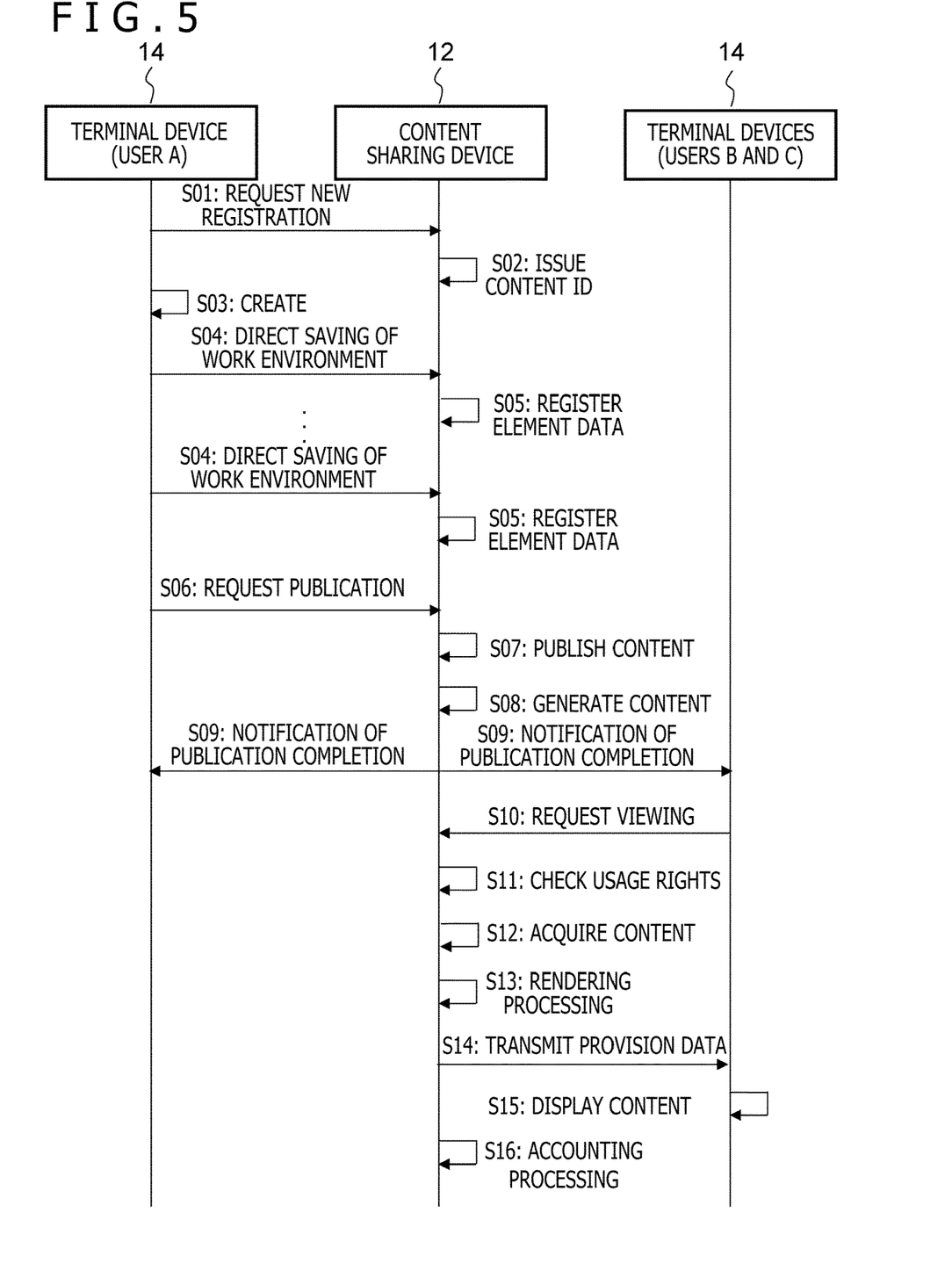
FIG. 5 is a sequence diagram related to a first operation of the content sharing system.

In step S01 of FIG. 5, the terminal device 14 of the user A requests a new registration of content to the content sharing device 12. Specifically, after accepting a predetermined operation performed by the user A, the terminal device 14 transmits a request signal including the user ID to the content sharing device 12. Then, the content sharing device 12 receives the request signal from the terminal device 14 via the network NW and the communication circuit 20.

In step S02, the data processing circuit 26 of the content sharing device 12 issues a new content ID (the content name is "The Catchy Cat"). Accordingly, records of the element data groups 40 and 42 and the copyright information 46 are added. The timing of this issuance will be hereinafter referred to as the "point in time of the start of creation T0."

In step S03, the user A creates content using the terminal device 14 and the electronic pen 16 that are owned by the user A. While the user A creates the content, the terminal device 14 sequentially generates element data (here, digital ink) indicating the elements of the content in response to the writing operation performed by the user A. Here, "digital ink" refers to ink data in a vector format that describes a set of strokes. The data format of the digital ink, a generally-called "ink description language," may be, for example, the Wacom ink layer language (WILL), the ink markup language (InkML), or the ink serialized format (ISF).

In step S04, the terminal device 14 of the user A directs the content sharing device 12 to save the work environment of the content. Specifically, after accepting a predetermined operation performed by the user A, the terminal device 14 transmits digital ink to the content sharing device 12 in association with the user ID and the content ID. Then, the content sharing device 12 receives the digital ink generated by the terminal device 14 via the network NW and the communication circuit 20.

In step S05, the data processing circuit 26 of the content sharing device 12 supplies the acquired digital ink to the content element DB 34 together with the content ID. Accordingly, the element data group 40 corresponding to the content "The Catchy Cat" is updated (at the point in time of registration T1 in FIG. 2).

After that, each time the operations in steps S03 to S05 are repeated, the element data group 40 is sequentially updated (at the points in time of registration T2 and T3 in FIG. 2). Note that even if a previously added content element is later deleted to change a draft or a design, the deletion of the previously added content element is retained as the editing history of the content element.

In step S06, the terminal device 14 of the user A requests the content sharing device 12 to publish the completed content (hereinafter referred to as the main content 50). Specifically, after accepting a predetermined operation performed by the user A, the terminal device 14 transmits a request signal including the user ID and the content ID to the content sharing device 12.

In step S07, the data processing circuit 26 of the content sharing device 12 performs processing of publishing the main content 50. Specifically, the data processing circuit 26 updates the element data group 40 such that the publication flag of the content "The Catchy Cat" becomes "ON" (at the point in time of registration T4 in FIG. 2).

In step S08, the content acquisition circuit 28 generates the main content 50 using the group of content elements generated during the period from the point in time of the start of creation of the main content 50 (T0) to the point in time of the publication of the main content 50 (T4). Specifically, the content acquisition circuit 28 generates a completed version of the main content 50 that reflects all the editing histories using the element data group 40 accumulated prior to the point in time of the publication of the main content 50.

Further, the content acquisition circuit 28 generates the sub-content 52, which is different from the main content 50, using one or a plurality of content elements among the group of content elements described above. Specifically, the content acquisition circuit 28 generates a still image or a moving image, which depicts a process of creating the main content 50, using the element data group 40 accumulated prior to the point in time of the publication of the main content 50. Note that each of the main content 50 and the sub-content 52 is stored in the storage 24 in association with the content ID.

Figure 6A:
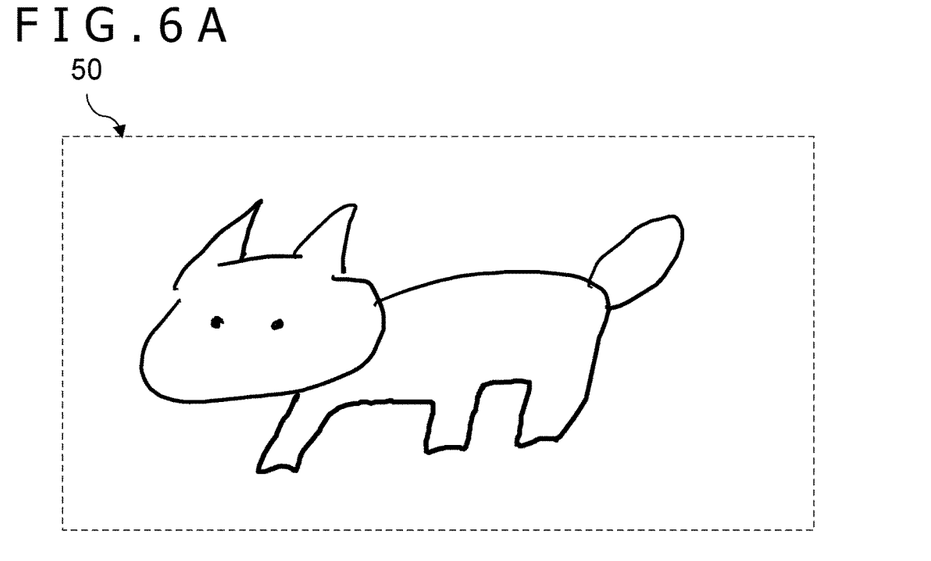
FIG. 6A is a diagram illustrating an example of main content.
Figure 6B:
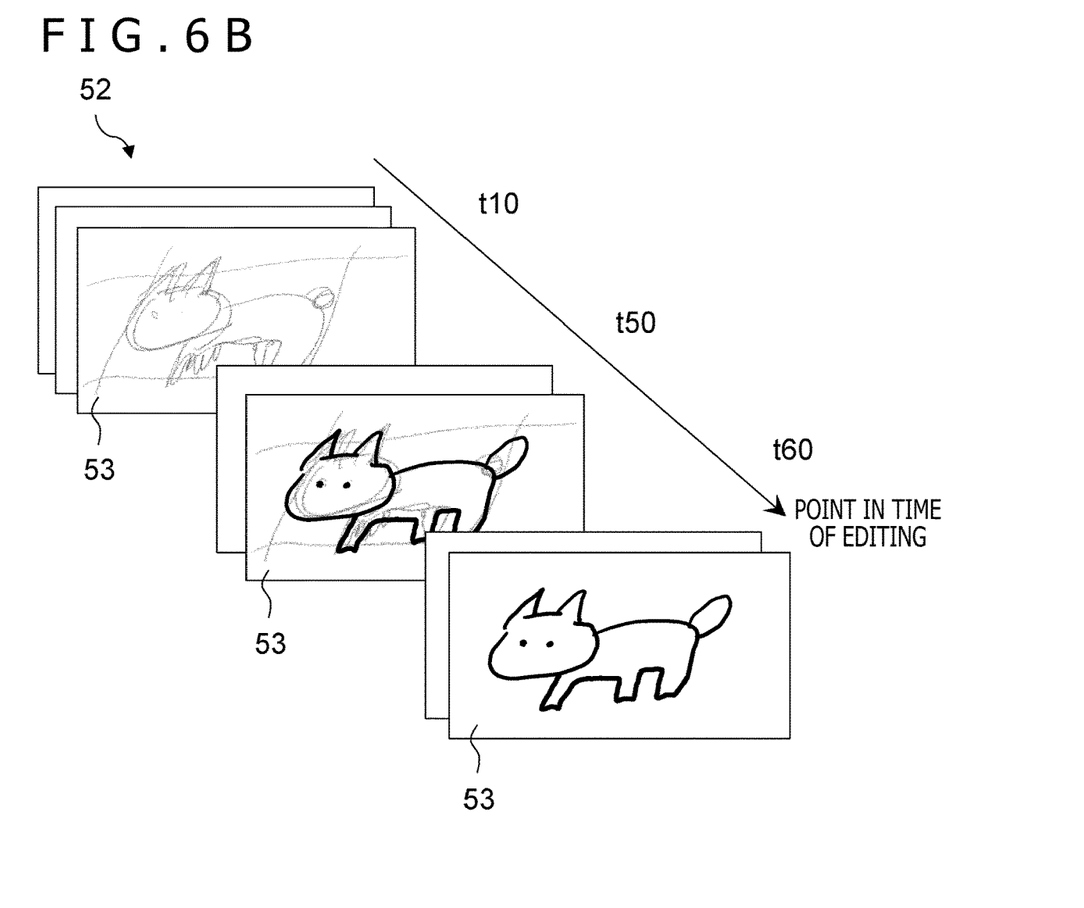
FIG. 6B is a diagram illustrating an example of sub-content.

FIG. 6A is a diagram illustrating an example of the main content 50. The main content 50 depicts a handwritten illustration of a cat. In addition, FIG. 6B is a diagram illustrating an example of the sub-content 52. The sub-content 52 is a moving image obtained by arranging a plurality of still images 53 in chronological order of editing.

Incidentally, in the example described above, both the main content 50 and the sub-content 52 are derived from digital ink. Here, "derived from digital ink" means either that the content is digital ink itself, or that the content has been generated based on the digital ink. Here, it is assumed that at least one of the main content 50 and the sub-content 52 is derived from digital ink.

In step S09, the content sharing device 12 notifies the users A, B, and C that the main content 50 has been published. Specifically, the content sharing device 12 transmits a notification signal to the terminal devices 14 of the users A, B, and C. Accordingly, the user A can confirm the publication of the created content "The Catchy Cat" through the terminal device 14 owned by the user A. Meanwhile, the users B and C can recognize the presence of the new content "The Catchy Cat" through the terminal devices 14 respectively owned by the users B and C.

In step S10, each of the terminal devices 14 of the users B and C transmits a content viewing request to the content sharing device 12. Specifically, after accepting a predetermined operation performed by the users B and C, each of the terminal devices 14 of the users B and C transmits a request signal including the user ID and the content ID to the content sharing device 12. Then, the content sharing device 12 receives the request signal from the terminal devices 14 via the network NW and the communication circuit 20.

In step S11, the content acquisition circuit 28 of the content sharing device 12 reads and refers to the user information 44 to check the membership type (here, "general member" or "special member") of the users B and C who have requested viewing.

In step S12, the content acquisition circuit 28 reads and acquires the content corresponding to the usage rights of the user from the storage 24. Specifically, when there is a request from the user B who is a general member who does not have the rights to use the sub-content 52, the content acquisition circuit 28 acquires only the main content 50. By contrast, when there is a request from the user C who is a special member who has the rights to use the sub-content 52, the content acquisition circuit 28 acquires both the main content 50 and the sub-content 52. Note that the presence or absence (or necessity) of the rights to use the sub-content 52 may be selectable for each main content 50 through an input operation from the terminal device 14.

In step S13, the content acquisition circuit 28 performs rendering processing on the content, if necessary, to convert the content into data suitable for the terminal device 14. This rendering processing includes, for example, [1] rasterization processing for converting data from a vector format into a raster format, [2] image processing for creating a moving image from a plurality of still images, [3] content compression processing, or [4] content encryption processing.

For example, when the main content 50 is digital ink and the terminal device 14 does not have a rasterization function, the content acquisition circuit 28 may perform the rasterization processing instead of the terminal device 14. The content acquisition circuit 28 may also convert the data into either the vector format or the raster format having a smaller data size.

In step S14, the transmission processing circuit 30 of the content sharing device 12 transmits provision data including the content to the terminal devices 14 of the users B and C. Accordingly, the terminal device 14 of the user B receives the first provision data D1 including only the main content 50 via the communication circuit 20 and the network NW. Meanwhile, the terminal device 14 of the user C receives the second provision data D2 including both the main content 50 and the sub-content 52 via the communication circuit 20 and the network NW.

When the main content 50 is digital ink, the transmission processing circuit 30 may transmit the first provision data D1 or the second provision data D2 which includes the main content 50 having been rasterized. Accordingly, even if the terminal device 14 does not have the rasterization function, the terminal device 14 can handle the main content 50 as raster format data.

The transmission processing circuit 30 may transmit the first provision data D1 or the second provision data D2 which includes the main content 50 not having been rasterized and on which authenticity-related countermeasure processing has been performed. Examples of this countermeasure include digital signature, digital authentication, a timestamp, a digital watermark, digital signature type QR (DSQR), and blockchain (distributed ledger).

In step S15, the terminal device 14 displays the content included in the provision data received from the content sharing device 12. The user B who is a general member can view only the main content 50 illustrated in FIG. 6A using the terminal device 14 owned by the user B. By contrast, the user C who is a special member can view not only the main content 50 but also the sub-content 52 illustrated in FIG. 6B using the terminal device 14 owned by the user C.

Here, the terminal device 14 may display only the main content 50 and the sub-content 52 whose data authenticity has been confirmed. For example, the terminal device 14 may calculate a hash value by applying a predetermined hash function to a group of stroke data indicating the main content 50, and determine that the main content 50 is authentic data when the calculated value matches a comparison value. Note that the "comparison value" is a hash value generated in advance by the content sharing device 12 using the hash function described above. Further, the comparison value may be data that the content sharing device 12 has made publicly accessible, or may be metadata that has been transmitted along with the provision data.

In step S16, the accounting processing circuit 32 of the content sharing device 12 performs accounting processing related to the use of the main content 50 or the sub-content 52. Specifically, the accounting processing circuit 32 calculates the amount to be received by the user A and the amount to be paid by each of the users B and C in accordance with a predetermined calculation method, and updates the contents of the "payment history" or the "reception history" of the copyright information 46. For example, the amount to be paid by the user C may be set higher than the amount to be paid by the user B by the fee for the use of the sub-content 52.

In this manner, the content sharing system 10 continues to perform the first operation illustrated in FIG. 5 while the main content 50 is (remains) published. This allows the main content 50 created by the user A to be shared among a plurality of users.

Summary of First Operation

As described above, the content sharing system 10 includes the content sharing device 12 and at least one terminal device 14, which can communicate bidirectionally with the content sharing device 12. The content sharing device 12 described above includes the content acquisition circuit 28 and the transmission processing circuit 30. The content acquisition circuit 28 acquires the main content 50 and the sub-content 52, at least one of which is derived from digital ink. In response to receipt of a request made by the terminal device 14 operated by a user, the transmission processing circuit 30 selects either the first provision data D1 including only the main content 50 or the second provision data D2 including both the main content 50 and the sub-content 52 depending on the usage rights of the user, and transmits the selected provision data to the terminal device 14.

In this content sharing method and program, one or a plurality of computers execute an acquisition step (S08 and S12 of FIG. 5) of acquiring the main content 50 and the sub-content 52, and, a transmission step (S14 of FIG. 5) of, in response to receipt of a request made by the terminal device 14 operated by a user, selecting either the first provision data D1 including only the main content 50 or the second provision data D2 including both the main content 50 and the sub-content 52 depending on the usage rights of the user, and transmitting the selected provision data to the terminal device 14.

Further, the method and program selectively provide, depending on the usage rights of the user, the sub-content 52 including content generated using a plurality of content elements that are generated before the main content 50 is published. Accordingly, fine-tuned services according to user preferences can be provided.

The content sharing device 12 further includes the storage 24. The storage 24 sequentially stores, in association with the point in time of editing, each content element generated at and after the point in time of the start of creation of the main content 50. The content acquisition circuit 28 may acquire the sub-content 52 by generating a still image or a moving image, which depicts a process of creating the main content 50, using one or a plurality of content elements whose point in time of editing is earlier than the point in time of the publication of the main content 50 among a group of content elements stored in the storage 24. This allows the user to have a simulated experience of the process of creating the main content 50 by viewing the sub-content 52, thereby further deepening the user's "attachment" (generally-called engagement) to the main content 50.

Second Operation of Content Sharing System 10

Next, a second operation of the content sharing system 10 will be described, mainly with reference to the sequence diagram of FIG. 7. The "second operation" refers to the operation related to the creation of content derived from the main content 50. The following description is based on a use case, as an example, in which the user A who is a creator creates the main content 50, and users C and D create fan content based on the main content 50.

Description of Sequence Diagram

Figure 7:
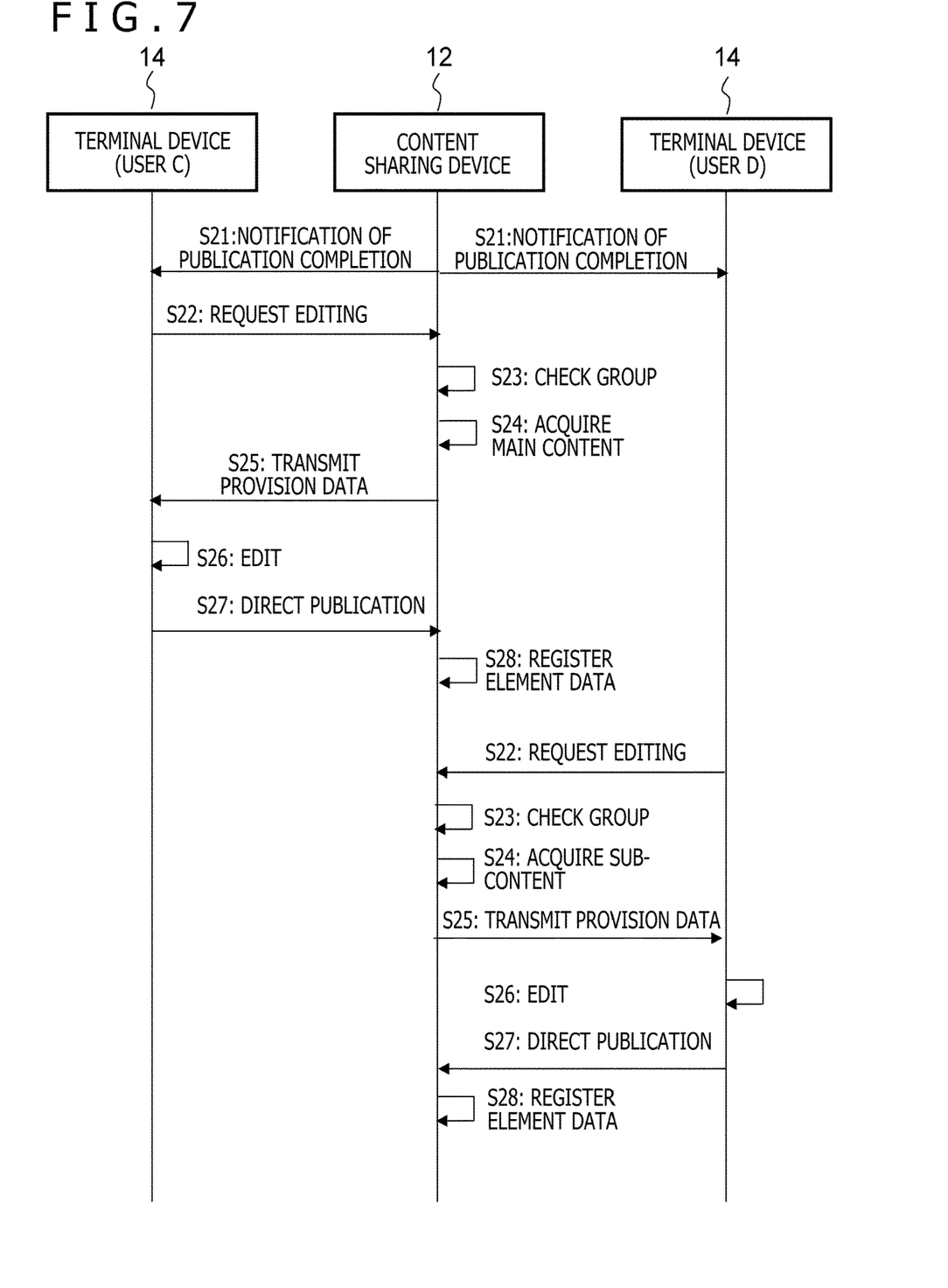
FIG. 7 is a sequence diagram related to a second operation of the content sharing system.

In step S21 of FIG. 7, the content sharing device 12 notifies the users C and D that the main content 50 has been published. Specifically, the content sharing device 12 transmits a notification signal to the terminal devices 14 of the users C and D. Accordingly, the users C and D can recognize the presence of the new content "The Catchy Cat" through the terminal devices 14 respectively owned by the users C and D. Here, it is assumed that the users C and D who are special members have been granted the rights to create fan content (that is, the rights to edit the main content 50).

In step S22, the terminal device 14 of the user C makes a request to edit the main content 50 to the content sharing device 12. Specifically, after accepting a predetermined operation performed by the user C, the terminal device 14 transmits a request signal including the user ID, the content ID, and the belonging group to the content sharing device 12. Then, the content sharing device 12 receives the request signal from the terminal device 14 via the network NW and the communication circuit 20.

In step S23, the content acquisition circuit 28 of the content sharing device 12 reads and refers to the user information 44 to check the group to which the user C who has requested editing belongs (here "A's Fun Club").

In step S24, the content acquisition circuit 28 reads and acquires the content corresponding to the group, to which the user C belongs, from the storage 24. At the timing immediately after the main content 50 is published, the content acquisition circuit 28 acquires the main content 50 that is the most recently published content.

In step S25, the content sharing device 12 transmits the first provision data D1 including the main content 50 to the terminal device 14 of the user C. For the same reason as the first operation, when the main content 50 is digital ink in the vector format, the transmission processing circuit 30 may transmit the first provision data D1 (or the second provision data D2) which includes the main content 50 having been rasterized.

In step S26, the user C edits the main content 50 using the terminal device 14 and the electronic pen 16 that are owned by the user C. During this editing, the terminal device 14 sequentially generates element data (here, digital ink) indicating the elements of the content in response to the writing operation performed by the user C.

In step S27, the terminal device 14 of the user C requests the content sharing device 12 to publish the edited content (hereinafter referred to as the derivative content 54). Specifically, after accepting a predetermined operation performed by the user C, the terminal device 14 transmits the digital ink to the content sharing device 12 in association with the user ID and the content ID.

In step S28, the data processing circuit 26 of the content sharing device 12 performs processing of publishing the derivative content 54. Specifically, the data processing circuit 26 adds the element data corresponding to the content "The Catchy Cat-D1" and updates the element data group 42 such that the publication flag becomes "ON" (at the point in time of registration T5 in FIG. 3).

Similarly, the user D who belongs to the same group as the user C makes additional edits to the derivative content 54 through the execution of steps S22 to S28. Note that prior to editing, the content sharing device 12 transmits the second provision data D2 including the derivative content 54 to the terminal device 14 of the user D in step S25. Accordingly, the data processing circuit 26 adds the element data corresponding to the content "The Catchy Cat-D1" and updates the element data group 42 such that the publication flag becomes "ON" (at the point in time of registration T6 in FIG. 3).

Figure 8A:
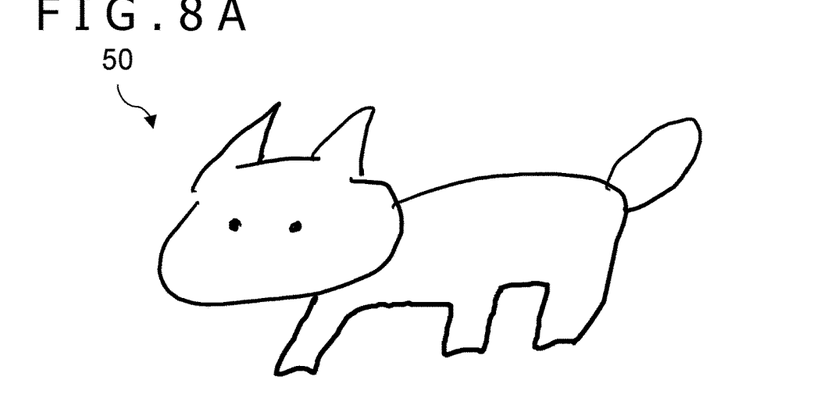
FIG. 8A is a diagram illustrating an example of the main content.

FIG. 8A is a diagram illustrating an example of the main content 50. As with FIG. 6A, the main content 50 depicts a hand-drawn illustration of a cat. When the user C edits the main content 50 in handwriting, the drawing contents of the content transition from FIG. 8A to FIG. 8B.

Figure 8B:
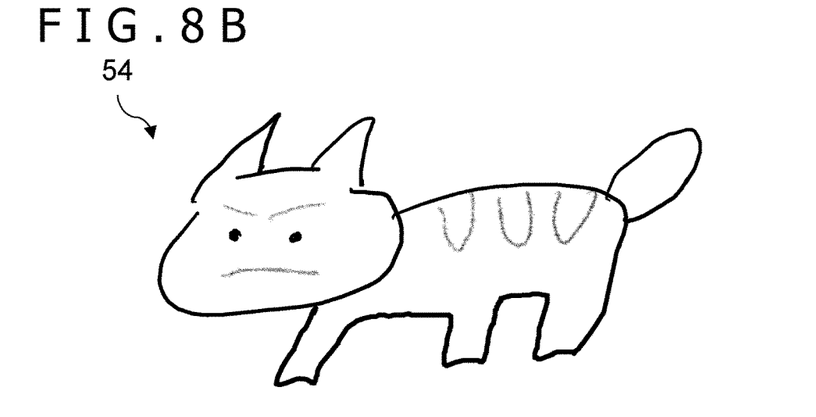
FIG. 8B is a diagram illustrating an example of first derivative content.

FIG. 8B is a diagram illustrating an example of the first derivative content 54. The derivative content 54 is obtained by adding eyebrows, mouth, and back hair patterns to the main content 50. When the user D edits the derivative content 54 by handwriting (or hand-drawing), the drawing contents of the content transition from FIG. 8B to FIG. 8C.

Figure 8C:
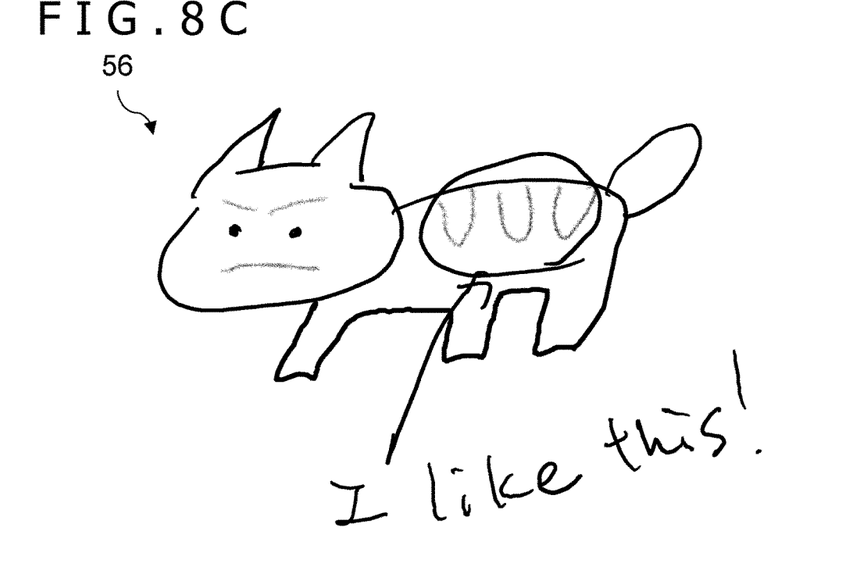
FIG. 8C is a diagram illustrating an example of second derivative content.

FIG. 8C is a diagram illustrating an example of the second derivative content 56. The derivative content 56 is obtained by adding a textual comment on the "back hair patterns" of the derivative content 54.

Figure 9:
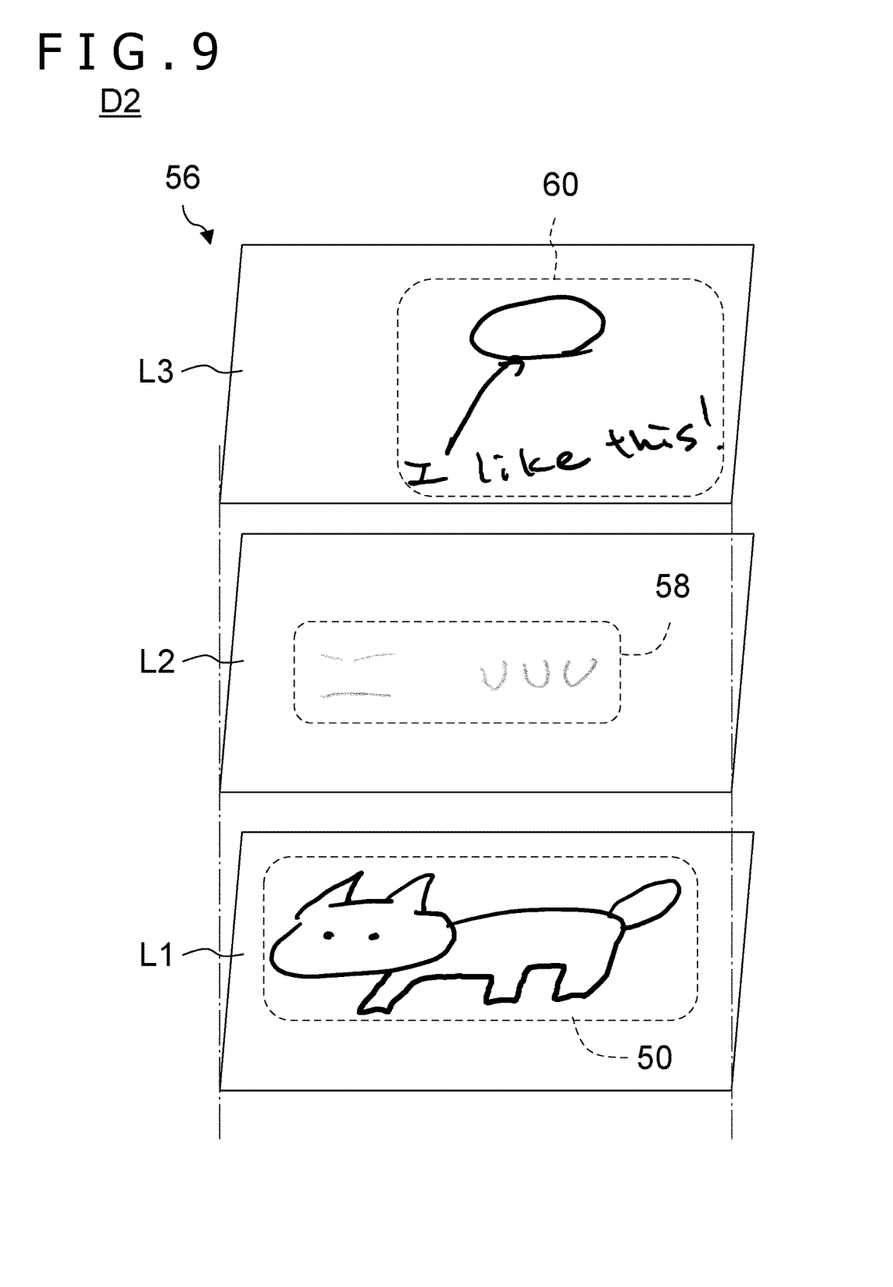
FIG. 9 is a diagram illustrating an example of the data structure of second provision data.

FIG. 9 illustrates an example of the data structure of the second provision data D2. In the example illustrated in FIG. 9, the second provision data D2 depicts the drawing contents of the derivative content 56 illustrated in FIG. 8C. The second provision data D2 has layer structure data obtained by overlapping a layer L1, a layer L2, and a layer L3 with each other from the bottom to top. The layer L1 corresponds to the main content 50. The layer L2 corresponds to sub-content 58. The layer L3 corresponds to sub-content 60.

With this data structure, the main content 50 and the pieces of sub-content 58 and 60 can be managed separately, so that data handling is improved accordingly. For example, by selectively combining layers L1 to L3, which are display targets, the main content 50, the derivative content 54 or 56, or the sub-content 58 and/or 60 may be selectively displayed without having to recreate the content.

In this manner, the content sharing system 10 may continue to perform the second operation illustrated in FIG. 7 while editing of the main content 50 is permitted. This configuration allows a plurality of users to be involved in the creation of the pieces of derivative content 54 and 56 based on the main content 50.

Although the group "A's Fun Club" creates the pieces of derivative content 54 and 56 in the example described above, another group (e.g., "Freaks of A") may create another derivative content "The Catchy Cat-D2." In this case, the storage 24 stores a group of content elements for each group including a plurality of users involved in the creation of the pieces of derivative content 54 and 56. In this case, the transmission processing circuit 30 needs to transmit the second provision data D2 including the derivative content created by the group to which the user belongs.

Further, as in the case of the first embodiment, the transmission processing circuit 30 may transmit the first provision data D1 or the second provision data D2 which includes the main content 50 not having been rasterized and on which authenticity-related countermeasure processing has been performed. Further, as in the case of the first embodiment, the terminal device 14 may display only the main content 50 and the pieces of derivative content 54 and 56 whose data authenticity has been confirmed.

It is possible that simultaneously editing the main content 50 or the pieces of derivative content 54 and 56 from multiple terminal devices 14 may impair the consistency of the content. Therefore, the element data groups 40 and 42 may be managed using a blockchain technique by which content elements for a certain period of time are grouped into blocks and the terminal devices 14 verify the accumulation of correct records with each other.

The creation of the pieces of derivative content 54 and 56 may complicate the attribution of the copyright. Therefore, the accounting processing circuit 32 may perform accounting processing related to the fee for the use of the main content 50, the pieces of sub-content 58 and 60, or the pieces of derivative content 54 and 56 as copyrighted works. Further, the share of copyright (that is, the distribution ratio of the fee for the use of the content) may change depending on whether the content is a primary work or a derivative work. Therefore, the accounting processing circuit 32 may determine the fee for the use of a copyrighted work related to the first provision data D1 in accordance with a first rule, while determining the fee for the use of a copyrighted work related to the second provision data D2 in accordance with a second rule different from the first rule. Here, "the second rule is different from the first rule" means that at least one of the calculation formula for determining the overall fee for the use of the copyrighted work, the coefficients of the calculation formula, and the distribution ratio of the fee for the use of the copyrighted work is different between the first rule and the second rule.

Summary of Second Operation

As described above, the content sharing device 12 includes the content acquisition circuit 28 and the transmission processing circuit 30. The content acquisition circuit 28 acquires the main content 50 and the pieces of sub-content 58 and 60. In response to the receipt of a request made by the terminal device 14 operated by the user, the transmission processing circuit 30 selects either the first provision data D1 including only the main content 50 or the second provision data D2 including both the main content 50 and the pieces of sub-content 58 and 60 depending on the usage rights of the user and transmits the selected provision data to the terminal device 14.

In this content sharing method and program, one or a plurality of computers execute an acquisition step (S24 of FIG. 7) of acquiring the main content 50 and the pieces of sub-content 58 and 60 and a transmission step (S25 of FIG. 7) of, in response to receipt of a request made by the terminal device 14 operated by the user, selecting either the first provision data D1 including only the main content 50 or the second provision data D2 including both the main content 50 and the pieces of sub-content 58 and 60 depending on the usage rights of the user and transmitting the selected provision data to the terminal device 14.

In this manner, the content sharing method and program selectively provide, depending on the usage rights of the user, the pieces of sub-content 58 and 60 including content generated using a plurality of content elements that are generated after the main content 50 is published. Accordingly, fine-tuned services according to user preferences can be provided.

The content sharing device 12 further includes the storage 24. The storage 24 sequentially stores, in association with the point in time of editing, each content element generated at and after the point in time of the start of creation of the main content 50. The content acquisition circuit 28 may acquire the pieces of sub-content 58 and 60 for generating the pieces of derivative content 54 and 56 derived from the main content 50 using one or a plurality of content elements whose point in time of editing is later than the point in time of the publication of the main content 50 among a group of content elements stored in the storage 24. This allows the users to be involved in the creation of the pieces of derivative content 54 and 56 based on the main content 50 and share the common interest and sense of unity through the joint creation.

Modifications

In the embodiments described above, the content acquisition circuit 28 of the content sharing device 12 generates and acquires the main content 50 using the element data group 40 sequentially stored in the storage 24. Instead of this acquisition method, for example, the main content 50 which has already been created may be acquired directly from an external device.

Figure 10:
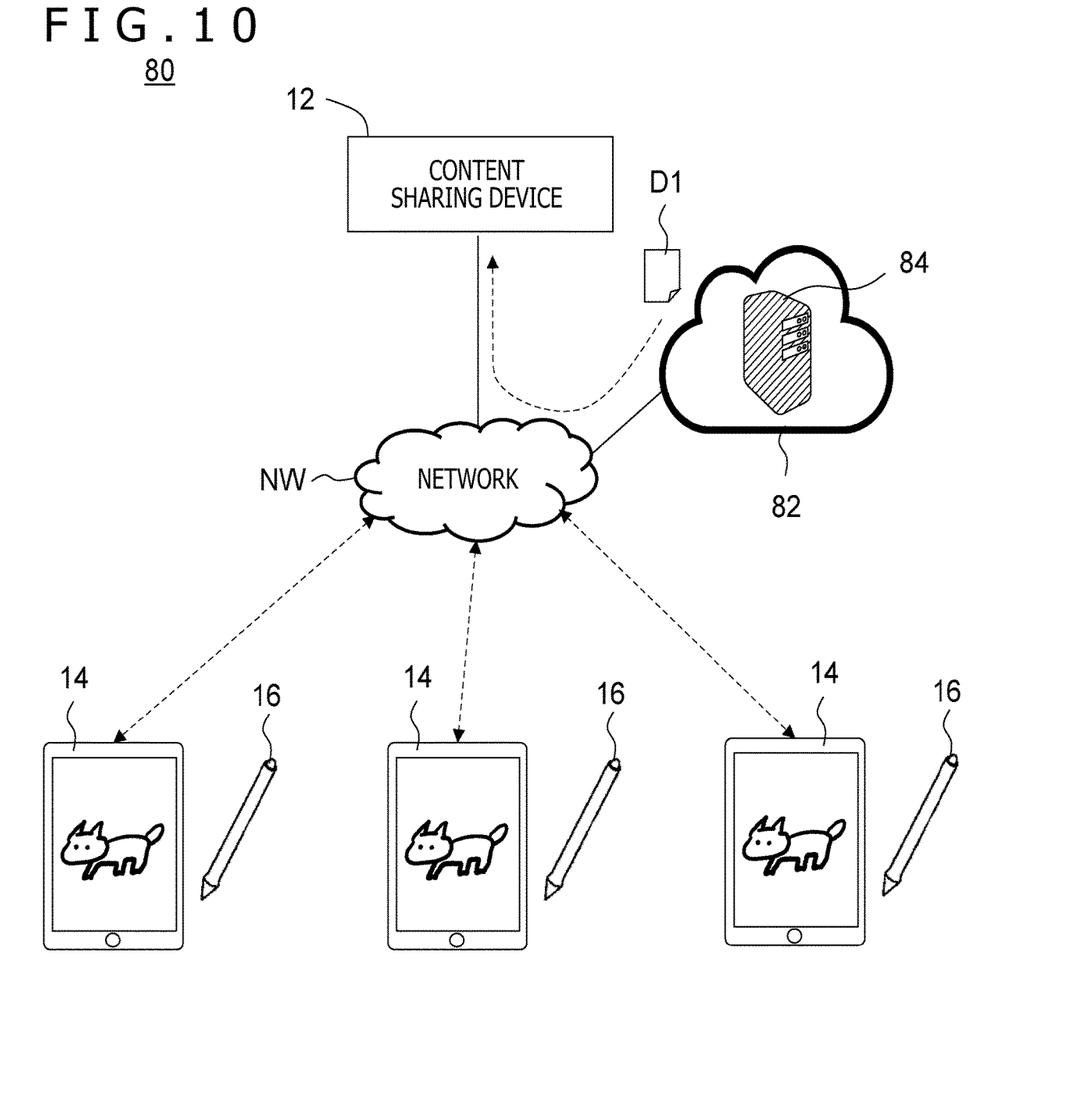
FIG. 10 is an overall configuration diagram of a content sharing system according to a modification.

FIG. 10 is an overall configuration diagram of a content sharing system 80 according to a modification. The content sharing system 80 includes a social networking service (SNS) server 84 in addition to the content sharing device 12 and at least one terminal device 14. The SNS server 84 is built on a cloud 82. The SNS server 84 is one or a plurality of server computers that enable a plurality of users to exchange various types of information with each other. The information that can be exchanged among users includes, for example, messages, stamps, images, documents, e-books, and annotations.

Here, the content acquisition circuit 28 of the content sharing device 12 may acquire the first provision data D1 including the main content 50 from the SNS server 84. Moreover, the content acquisition circuit 28 may acquire the main content 50 while selecting whether or not to make a provider anonymous. By making a provider who does not wish to be identified anonymous, the anonymity of the SNS provided by the SNS server 84 can be ensured.

The invention claimed is:

1. A content sharing device, comprising:
a content acquisition circuit configured to acquire main content and sub-content, at least one of which is derived from digital ink;
a transmission processing circuit configured to, in response to receipt of a request made by a terminal device operated by a user, select either first provision data or second provision data depending on usage rights of the user and transmit the first or second provision data that has been selected to the terminal device, the first provision data including only the main content that has been acquired by the content acquisition circuit, the second provision data including both the main content and the sub-content that have been acquired by the content acquisition circuit, and
a storage configured to sequentially store, in association with a point in time of editing, each content element generated at or after a point in time of start of creation of the main content,
wherein the sub-content includes content generated using a plurality of content elements that are generated before the main content is published or content generated using a plurality of content elements that are generated after the main content is published,
wherein the content acquisition circuit acquires the sub-content by generating a still image or a moving image that depicts a process of creating the main content using one or a plurality of content elements whose point in time of editing is earlier than a point in time of the publication of the main content among a group of content elements stored in the storage,
wherein, when the main content is the digital ink, the transmission processing circuit transmits the first or second provision data that includes the main content not having been rasterized and on which authenticity-related countermeasure processing has been performed.

2. The content sharing device according to claim 1, wherein, when the main content is the digital ink, the transmission processing circuit transmits the first or second provision data that includes the main content having been rasterized.

3. The content sharing device according to claim 1,
wherein the content acquisition circuit acquires the sub-content for generating derivative content derived from the main content using one or a plurality of content elements whose point in time of editing is later than a point in time of the publication of the main content among a group of content elements stored in the storage.

4. The content sharing device according to claim 3, wherein, when the main content is the digital ink, the transmission processing circuit transmits the first or second provision data that includes the main content having been rasterized.

5. The content sharing device according to claim 3, wherein the second provision data includes layer structure data obtained by overlapping a layer corresponding to the main content with a layer corresponding to the sub-content.

6. The content sharing device according to claim 3,
wherein the storage stores the group of content elements for each group including a plurality of users involved in creation of the derivative content, and
the transmission processing circuit transmits the second provision data that includes the derivative content created by a user group to which the user belongs.

7. The content sharing device according to claim 3, further comprising:
an accounting processing circuit configured to perform accounting processing related to a fee for use of the main content, the sub-content, or the derivative content.

8. The content sharing device according to claim 7, wherein the accounting processing circuit determines a fee for use of a copyrighted work related to the first provision data in accordance with a first rule, while determining a fee for use of a copyrighted work related to the second provision data in accordance with a second rule different from the first rule.

9. The content sharing device according to claim 1, wherein the content acquisition circuit acquires the main content by selecting whether or not to make a provider anonymous.

10. A content sharing method performed by one or a plurality of computers, comprising:
acquiring main content and sub-content, at least one of which is derived from digital ink;
in response to receipt of a request made by a terminal device operated by a user, selecting either first provision data or second provision data depending on usage rights of the user and transmitting the first or second provision data that has been selected to the terminal device, the first provision data including only the main content that has been acquired, the second provision data including both the main content and the sub-content that have been acquired, and
sequentially storing, in association with a point in time of editing, each content element generated at or after a point in time of start of creation of the main content,
wherein the sub-content includes content generated using a plurality of content elements that are generated before the main content is published or content generated using a plurality of content elements that are generated after the main content is published,
wherein the sub-content is acquired by generating a still image or a moving image that depicts a process of creating the main content using one or a plurality of content elements whose point in time of editing is earlier than a point in time of the publication of the main content among a group of content elements which are stored, and
wherein, when the main content is the digital ink, the first or second provision data is transmitted that includes the main content not having been rasterized and on which authenticity-related countermeasure processing has been performed.

11. A non-transitory computer readable medium storing a program configured to cause one or a plurality of computers to perform:
- acquiring main content and sub-content, at least one of which is derived from digital ink;
- in response to receipt of a request made by a terminal device operated by a user, selecting either first provision data or second provision data depending on usage rights of the user and transmitting the first or second provision data that has been selected to the terminal device, the first provision data including only the main content that has been acquired, the second provision data including both the main content and the sub-content that have been acquired, and
- sequentially storing, in association with a point in time of editing, each content element generated at or after a point in time of start of creation of the main content,
- wherein the sub-content includes content generated using a plurality of content elements that are generated before the main content is published or content generated using a plurality of content elements that are generated after the main content is published,
- wherein the sub-content is acquired by generating derivative content derived from the main content using one or a plurality of content elements whose point in time of editing is later than a point in time of the publication of the main content among a group of content elements which are stored, and
- wherein, when the main content is the digital ink, the first or second provision data is transmitted that includes the main content not having been rasterized and on which authenticity-related countermeasure processing has been performed.

12. A content sharing system comprising:
a content sharing device including:
- a content acquisition circuit configured to acquire main content and sub-content, at least one of which is derived from digital ink,
- a transmission processing circuit configured to, in response to receipt of a request made by a terminal device operated by a user, select either first provision data or second provision data depending on usage rights of the user and transmit the first or second provision data that has been selected to the terminal device, the first provision data including only the main content that has been acquired by the content acquisition circuit, the second provision data including both the main content and the sub-content that have been acquired by the content acquisition circuit, and
- a storage configured to sequentially store, in association with a point in time of editing, each content element generated at or after a point in time of start of creation of the main content,
- in which the sub-content includes content generated using a plurality of content elements that are generated before the main content is published or content generated using a plurality of content elements that are generated after the main content is published,
- wherein the content acquisition circuit acquires the sub-content by generating a derivative content derived from the main content using one or a plurality of content elements whose point in time of editing is later than a point in time of the publication of the main content among a group of content elements stored in the storage, and
- wherein, when the main content is the digital ink, the transmission processing circuit transmits the first or second provision data that includes the main content not having been rasterized and on which authenticity-related countermeasure processing has been performed; and
at least one terminal device, including said terminal device, configured to communicate bidirectionally with the content sharing device.

13. The content sharing system according to claim 12, wherein the second provision data includes layer structure data obtained by overlapping a layer corresponding to the main content with a layer corresponding to the sub-content.

14. The content sharing system according to claim 12,
- wherein the storage stores the group of content elements for each group including a plurality of users involved in creation of the derivative content, and
- the transmission processing circuit transmits the second provision data that includes the derivative content created by a user group to which the user belongs.

15. The content sharing system according to claim 12, further comprising:
an accounting processing circuit configured to perform accounting processing related to a fee for use of the main content, the sub-content, or the derivative content.

16. The content sharing system according to claim 15, wherein the accounting processing circuit determines a fee for use of a copyrighted work related to the first provision data in accordance with a first rule, while determining a fee for use of a copyrighted work related to the second provision data in accordance with a second rule different from the first rule.

17. The content sharing system according to claim 12, wherein the content acquisition circuit acquires the main content by selecting whether or not to make a provider anonymous.

* * * * *